United States Patent
Raimond et al.

(10) Patent No.: US 10,677,318 B2
(45) Date of Patent: Jun. 9, 2020

(54) GEARBOX FOR A DREDGING VESSEL

(71) Applicant: IHC Holland IE B.V., Sliedrecht (NL)

(72) Inventors: Cornelis Pieter Raimond, Papendrecht (NL); Johannes Martijn Vreugdenhil, Zwijndrecht (NL); Leendert Johannes Adriaan den Boer, Krimpen aan de Lek (NL); Arie de Jager, Sliedrecht (NL)

(73) Assignee: IHC Holland IE B.V., Sliedrecht (NL)

( * ) Notice: Subject to any disclaimer, the term of this patent is extended or adjusted under 35 U.S.C. 154(b) by 634 days.

(21) Appl. No.: 15/314,116

(22) PCT Filed: May 27, 2015

(86) PCT No.: PCT/NL2015/080380
§ 371 (c)(1),
(2) Date: Nov. 28, 2016

(87) PCT Pub. No.: WO2015/183088
PCT Pub. Date: Dec. 3, 2015

(65) Prior Publication Data
US 2017/0190402 A1     Jul. 6, 2017

(30) Foreign Application Priority Data
May 28, 2014   (NL) .................................... 2012904

(51) Int. Cl.
*F16H 1/20*       (2006.01)
*B63H 23/06*    (2006.01)
(Continued)

(52) U.S. Cl.
CPC ................ *F16H 1/20* (2013.01); *B63H 3/10* (2013.01); *B63H 23/06* (2013.01); *E02F 3/885* (2013.01);
(Continued)

(58) Field of Classification Search
CPC ......... E02F 9/202; E02F 5/006; E02F 3/8841; E02F 3/885; B63H 23/06; B63H 3/10; B63H 3/00; B63H 2023/0291
See application file for complete search history.

(56) References Cited

U.S. PATENT DOCUMENTS 3,326,056 A * 6/1967 Clements ................ F16D 23/10
                                                    74/339
3,620,336 A * 11/1971 Clements ................ F16D 23/10
                                                    192/35
(Continued)

FOREIGN PATENT DOCUMENTS

CN           2647748 Y      10/2004
CN         201301952 Y       9/2009
(Continued)

OTHER PUBLICATIONS

Wärtsilä—"Wärtsitä launches 2-speed marine gearbox to significantly reduce fuel consumption"—Feb. 12, 2014.

*Primary Examiner* — Patrick Cicchino
(74) *Attorney, Agent, or Firm* — N.V. Nederlandsch Octrooibureau; Catherine A. Shultz; Katelyn J. Bernier

(57) ABSTRACT

The invention relates to a manoeuvrable trailing dredging vessel comprising;
a vessel propulsion member coupled with a propulsion shaft provided with a single gear for driving the propulsion member,
a drive system having a central drive shaft coupled with the vessel propulsion member for providing power to the vessel propulsion member,
a transmission device having at least a trailing transmission shaft provided with a trailing pinion and a sailing transmission shaft provided with a sailing pinion,
wherein the central drive shaft is coupled with the single gear of the propulsion shaft through one of the trailing transmission shaft and the sailing transmission shaft.

5 Claims, 3 Drawing Sheets

(51) Int. Cl.
*E02F 3/88* (2006.01)
*E02F 5/00* (2006.01)
*E02F 9/20* (2006.01)
*B63H 3/10* (2006.01)
*B63H 23/02* (2006.01)
*B63B 35/00* (2020.01)

(52) U.S. Cl.
CPC ............ *E02F 3/8841* (2013.01); *E02F 5/006* (2013.01); *E02F 9/202* (2013.01); *B63B 35/00* (2013.01); *B63H 2023/0291* (2013.01); *E02F 3/8833* (2013.01)

(56) References Cited

U.S. PATENT DOCUMENTS

| | | | | |
|---|---|---|---|---|
| 3,794,441 | A | * | 2/1974 | Johnson .................. B63H 3/04 416/152 |
| 4,250,985 | A | * | 2/1981 | Clements ............... B63H 23/06 192/48.7 |
| 4,353,269 | A | * | 10/1982 | Hiersig .................. B63H 23/06 475/72 |
| 4,552,258 | A | * | 11/1985 | Sigg ....................... B63H 23/06 192/48.5 |
| 7,685,899 | B2 | * | 3/2010 | Mowbray .............. B63H 20/14 440/75 |
| 2007/0180941 | A1 | * | 8/2007 | Mowbray .............. B63H 20/14 74/335 |

FOREIGN PATENT DOCUMENTS

| | | | | |
|---|---|---|---|---|
| CN | 201385778 | Y | | 1/2010 |
| CN | 201516918 | U | | 6/2010 |
| CN | 202209384 | U | | 5/2012 |
| CN | 203127136 | U | | 8/2013 |
| GB | 642205 | A | * | 8/1950 ............. E02F 9/202 |
| GB | 846224 | A | | 8/1960 |
| GB | 883639 | A | | 12/1961 |
| JP | S54118976 | A | | 9/1979 |
| JP | S5854258 | A | | 3/1983 |

* cited by examiner

GEARBOX FOR A DREDGING VESSEL

BACKGROUND

The present invention relates to a manoeuvrable trailing dredging vessel, like a trailing suction hopper dredger (TSHD), comprising a vessel propulsion member coupled with a propulsion shaft for driving the propulsion member, and a drive system having a central drive shaft for providing power to the vessel propulsion member.

Such a trailing suction hopper dredger (TSHD) has two main sailing modes: 1) free sailing and 2) dredging with a drag head overboard—in short "trailing". During trailing it is known for a TSHD with controllable pitch propeller (CPP) to vary the propeller thrust by changing the pitch of the CPP blades. The engine (and propeller) speed then stays constant or at least may vary within a small range of speed. This thus almost constant engine speed is essential when driving a shaft generator to be able to supply enough power to electric consumers onboard of the TSHD, or when driving a dredge pump or jet pump(s).

In trailing mode, it is a given that the thrust needed from the propulsion system will change constantly. This is caused by factors like changing current speed and direction, water depth, drag head resistance etc. In general for a TSHD the trailing mode has the highest power consumption and therefore the trailing mode is decisive for the choice of the engine. With a controllable pitch propeller (CPP) in trailing mode the pitch of the propeller blades are varied. This results in a (much) lower efficiency of the propeller.

With a fixed pitch propeller (FPP) the propeller speed will be reduced by reducing engine speed when trailing. But however by reducing the engine speed the available engine power is also reduced significantly, which is undesirable.

CN 202 209 384 U discloses a marine gearbox. However, the propulsion shaft is not freely accessible because at least the drive shaft is arranged in line with the propulsion shaft.

JP S58 54258 A relates to a marine speed reduction reversing gear according to its title. Again, the propulsion shaft 25 is not freely accessible at its end as is clear from FIG. 3.

SUMMARY OF THE INVENTION

The invention aims to provide a manoeuvrable trailing dredging vessel with an improved efficiency in particular during trailing.

According to a first aspect of the invention this is realized with a manoeuvrable trailing dredging vessel comprising;

a vessel propulsion member coupled with a propulsion shaft provided with a single gear for driving the propulsion member, a drive system having a central drive shaft coupled with the vessel propulsion member for providing power to the vessel propulsion member, a transmission device having at least a trailing transmission shaft provided with a trailing pinion and a sailing transmission shaft provided with a sailing pinion, wherein the central drive shaft is coupled with the single gear of the propulsion shaft through one of the trailing transmission shaft and the sailing transmission shaft.

The single gear of the propulsion shaft whereto the drive system is coupled through one of the trailing transmission shaft and the sailing transmission shaft, enables to operate the engine and propeller at an optimum point of operation while the propulsion shaft may still be supported in a simple manner allowing robust bearing of axial forces experienced by the propulsion shaft during operations. It is conceivable that the trailing transmission shaft and the sailing transmission shaft are coupled with a different gear provided with the propulsion shaft, important is that the trailing transmission shaft and the sailing transmission shaft are coupled with the propulsion shaft such that the axial side of the propulsion shaft is freely accessible. The efficiency is improved during trailing because in providing the transmission device an optimal point of operation of the vessels engine and propeller can be chosen, reducing fuel consumption. In addition, because of the improved efficiency, the performance is increased with the same engine, or less power is needed during trailing and therefore it is possible to install smaller engines for the same TSHD performance.

In an embodiment, the propulsion shaft is hollow. The hollow shaft enables to accommodate therein control means operationally coupled with the controllable pitch propeller. It will be clear that is not required that the entire propulsion shaft is hollow, the shaft may be partly hollow. Of importance is that it is enabled to accommodate in the hollow shaft, control means operationally coupled with the controllable pitch propeller.

In an embodiment the propulsion member is a controllable pitch propeller. The varying CPP blade pitch enables much better and faster control of the thrust when compared with a fixed pitch propeller.

It is noted that also a TSHD executed with fixed pitch propellers (FPP) has an advantage with a two speed propulsion gearbox. Having a second gearbox reduction speed (resulting in a lower propeller speed at nominal engine speed) will result in an increase in available power during trailing. This again will enable the dredger to continue work in worse (current and weather) conditions.

In an embodiment, the manoeuvrable dredging vessel comprises control means operationally coupled with the controllable pitch propeller.

In an embodiment, the control means operationally coupled with the controllable pitch propeller are at least partly accommodated in the hollow shaft.

In an embodiment, the central drive shaft, the trailing transmission shaft and the sailing transmission shaft extend above the propulsion shaft. This facilitates maintenance.

In an embodiment, the central drive shaft, the trailing transmission shaft and the sailing transmission shaft extend in one shaft plane such that a divisible shaft housing may have a dividing line extending in said shaft plane. This facilitates to design a simple and robust housing.

In an embodiment, the trailing transmission shaft and the sailing transmission shaft each are provided with a respective clutch device for uncoupling and coupling with the central drive shaft in a driving manner. The respective clutch device for uncoupling and coupling with the central drive shaft in a driving manner are known per se.

In an embodiment, the respective clutch devices of the trailing transmission shaft and the sailing transmission shaft are arranged outside the shaft housing. The respective clutch devices being arranged outside the shaft housing, facilitates maintenance all the more.

The various aspects discussed in this patent can be combined in order to provide additional advantageous advantages.

DESCRIPTION OF THE DRAWINGS

The invention will be further elucidated referring to the schematic drawings wherein shown in:

FIG. 2b a side view of the propulsion system of FIG. 2a.

DETAILED DESCRIPTION OF EMBODIMENTS

Figure 1:
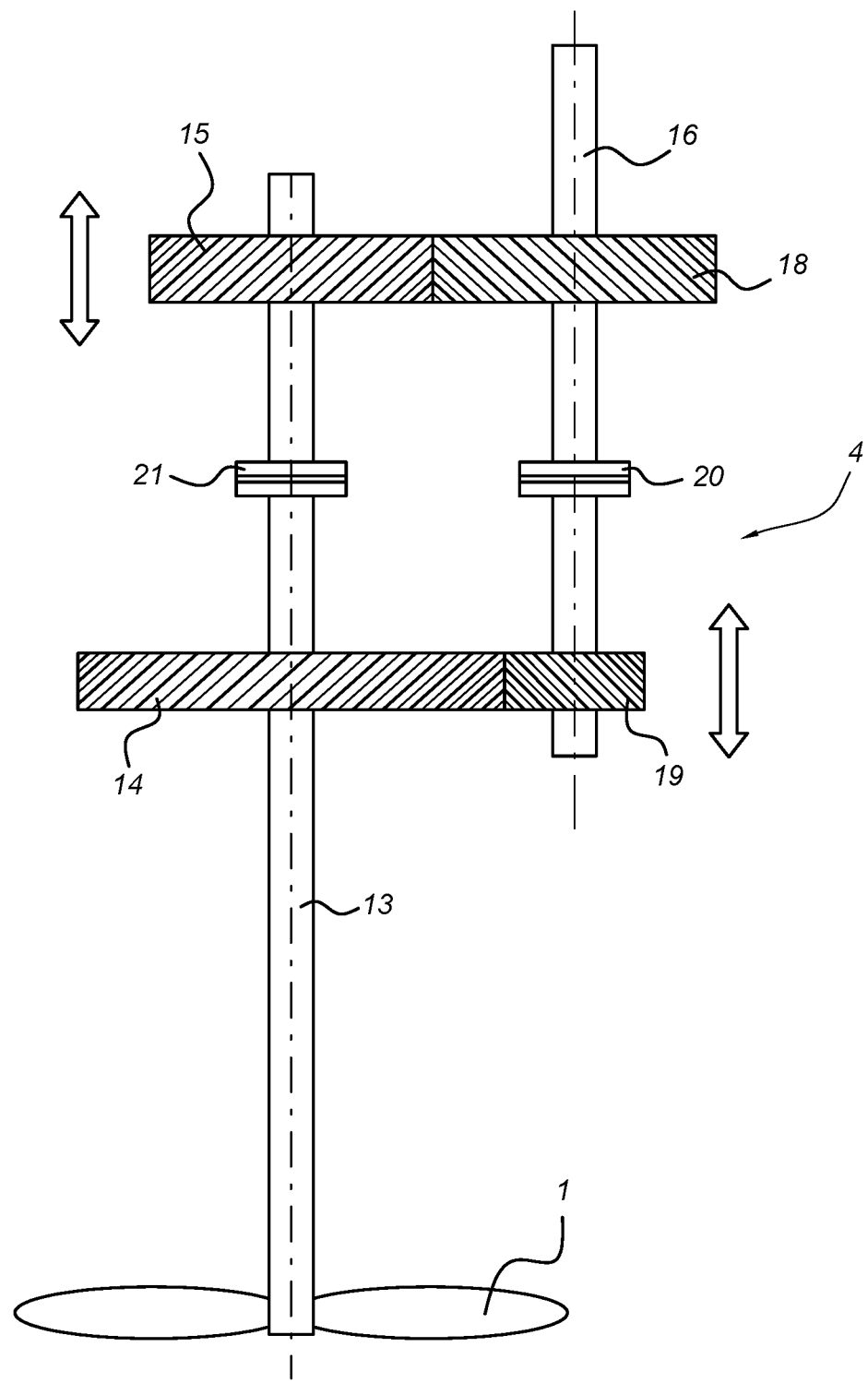
FIG. 1 in top view a prior art propulsion system.

In FIG. 1 a prior art propulsion system is shown. A vessel propulsion member 1 is coupled with a propulsion shaft 13. The shaft is provided with two gears 14, 15 for driving the propulsion member 1. Between the two gears 14, 15 a clutch device 21 is arranged. As is clear from the FIG. 1, the axial end of the shaft 13 is not readily accessible for supporting that end or introduce control means in the axial end of the shaft 13. A drive system (not shown) has a central drive shaft 16 coupled with the vessel propulsion member 1 for providing power to the vessel propulsion member. The transmission device has a trailing gearing through pinion 19 and gear 14 while clutch device 20 is engaged, and a sailing gearing through gear 18 and gear 15 while clutch device 21 is engaged. The trailing gearing and the sailing gearing together form the transmission device referred to with reference number 4.

Figure 2A:
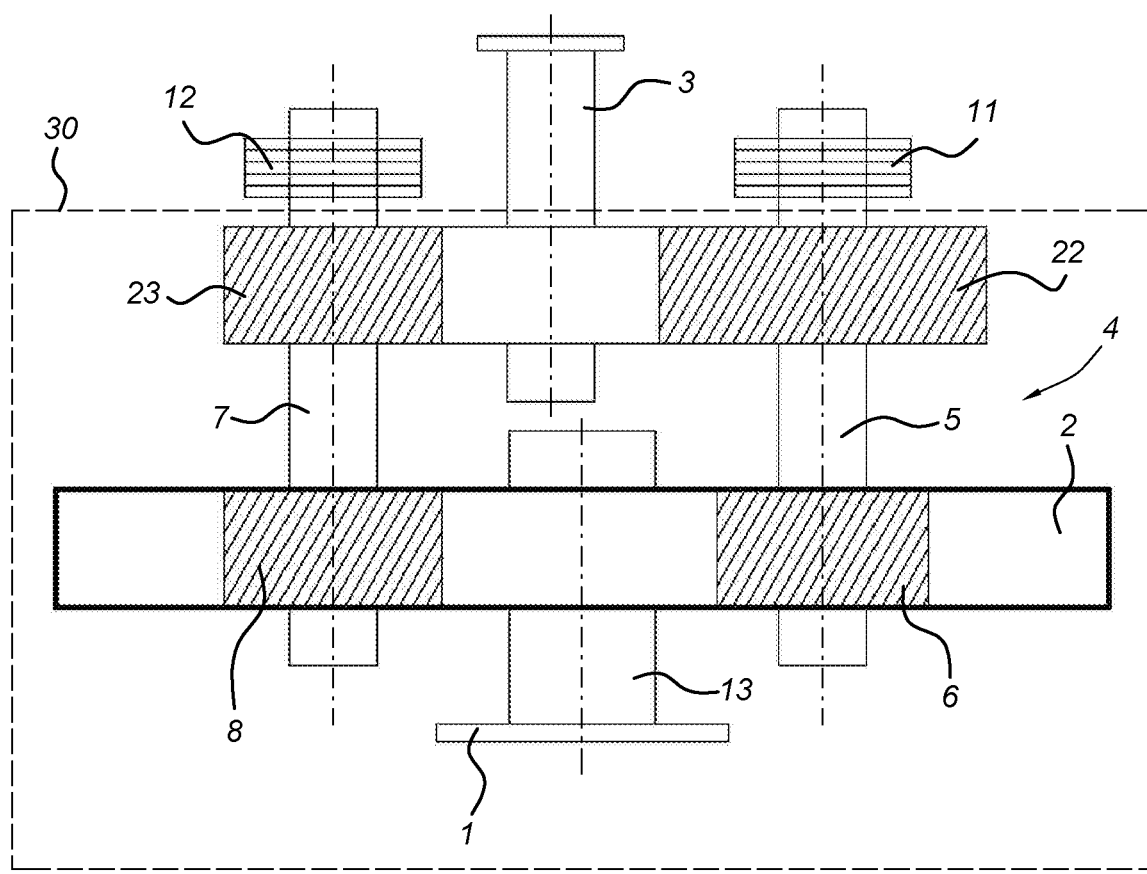
FIG. 2a a top view of a propulsion system according to the invention.
Figure 2B:
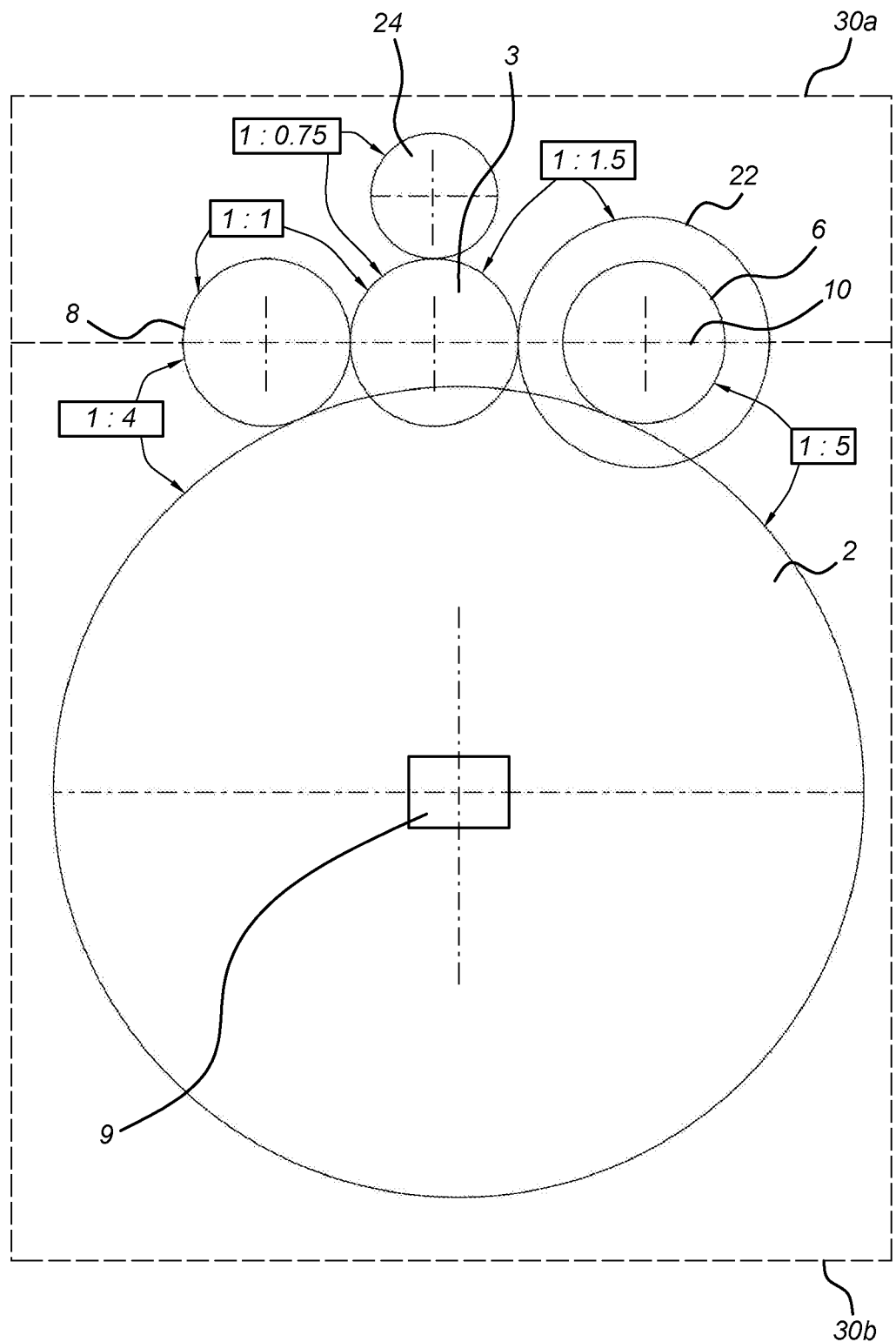

Now turning to a propulsion system according to the invention as shown in FIGS. 2a and 2b.

The FIGS. 2a and 2b show a vessel propulsion member 1 coupled with a propulsion shaft 13 provided with a single gear 2 for driving the propulsion member 1. The vessel itself is not shown.

The propulsion system comprises a drive system having a central drive shaft 3 coupled with the vessel propulsion member for providing power to the vessel propulsion member 1. The central drive shaft 3 is in tooth engagement with the vessel propulsion member 1.

The propulsion system comprises a transmission device 4 having at least a trailing transmission shaft 5 and a sailing transmission shaft 7. The trailing transmission shaft 5 is provided with a trailing pinion 6. During trailing transmission, the central drive shaft 3 is in tooth gear engagement with the vessel propulsion member 1 through the drive shaft pinion, gear 22, trailing pinion 6 and gear 2, in short the trailing gearing. The sailing transmission shaft 7 is provided with a sailing pinion 8. During sailing transmission, the central drive shaft 3 is in tooth gear engagement with the vessel propulsion member 1 through the drive shaft pinion, gear 23, sailing pinion 8 and gear 2, in short the sailing gearing.

The central drive shaft 3 is coupled with the single gear 2 of the propulsion shaft through one of the trailing transmission shaft and the sailing transmission shaft. The shifting between the trailing gearing 6, 2 and the sailing gearing 8, 2 is done in a manner known per se using the two clutch devices 11, 12. The trailing gearing and the sailing gearing together form the transmission device referred to with reference number 4.

The trailing transmission shaft 5 and the sailing transmission shaft 7 each are provided with a respective clutch device 11, 12 for uncoupling and coupling with the central drive shaft 3 in a driving manner. In this case, the respective clutch devices 11, 12 of the trailing transmission shaft 5 and the sailing transmission shaft 7 are arranged outside the shaft housing 30 for providing convenience regarding maintenance.

As schematically shown in FIG. 2b, there are provided control means 9 which are operationally coupled with the controllable pitch propeller 1. The control means 9 are at least partly accommodated in the propulsion shaft 13, which is hollow in this case.

As shown in FIG. 2b, the central drive shaft 3, the trailing transmission shaft 5 and the sailing transmission shaft 7 extend above the propulsion shaft 13. In this case, the trailing transmission shaft 5 and the sailing transmission shaft 7 extend in one shaft plane 10 such that a divisible shaft housing 30a, 30b may have a dividing line extending in said shaft plane.

In FIG. 2b examples of possible gear ratios are shown between different shafts 3, 5, 7, 13. It is clear that the trailing gearing has a higher gear ratio compared with the sailing gearing. Shaft 24 is an power take-off shaft to auxiliary equipment like a generator.

It will also be obvious after the above description and drawings are included to illustrate some embodiments of the invention, and not to limit the scope of protection. Starting from this disclosure, many more embodiments will be evident to a skilled person which are within the scope of protection and the essence of this invention and which are obvious combinations of prior art techniques and the disclosure of this patent.

The invention claimed is:

1. A manoeuvrable trailing dredging vessel comprising;
   a vessel propulsion member coupled with a propulsion shaft provided with a single gear for driving the propulsion member,
   a drive system having a central drive shaft coupled with the vessel propulsion member for providing power to the vessel propulsion member,
   a transmission device having at least a trailing transmission shaft provided with a trailing pinion and a sailing transmission shaft provided with a sailing pinion, the trailing pinion having a higher gear ratio than the sailing pinion;
   wherein the central drive shaft is coupled with the single gear of the propulsion shaft through one of the trailing transmission shaft and the sailing transmission shaft; and
   wherein the central drive shaft, the trailing transmission shaft and the sailing transmission shaft extend above the propulsion shaft,
   wherein the central drive shaft, the trailing transmission shaft and the sailing transmission shaft extend in one shaft plane such that a divisible shaft housing may have a dividing line extending in said shaft plane;
   wherein the trailing transmission shaft and the sailing transmission shaft each are provided with a respective clutch device for uncoupling and coupling with the central drive shaft in a driving manner; and
   wherein the respective clutch devices of the trailing transmission shaft and the sailing transmission shaft are arranged outside a shaft housing.

2. The manoeuvrable dredging vessel according to claim 1, wherein the propulsion shaft is hollow.

3. The manoeuvrable dredging vessel according to claim 2, wherein the propulsion member is a controllable pitch propeller.

4. The manoeuvrable dredging vessel according to claim 3, comprising control means operationally coupled with the controllable pitch propeller.

5. The manoeuvrable dredging vessel according to claim 4, wherein the control means operationally coupled with the controllable pitch propeller are at least partly accommodated in the hollow shaft.

* * * * *